(12) United States Patent
Valenzuela et al.

(10) Patent No.: US 12,381,748 B2
(45) Date of Patent: Aug. 5, 2025

(54) METHOD FOR ZERO TOUCH PROVISIONING OF AN OPERATIONAL NODE FOR A VIRTUALIZED NETWORK

(71) Applicant: Unified Sentinel Data Networks, LLC, Fort Lauderdale, FL (US)

(72) Inventors: Paul Valenzuela, Fort Lauderdale, FL (US); Christian Johnny Martinez, East Rockaway, NY (US)

(73) Assignee: UNIFIED SENTINEL DATA NETWORKS, LLC, Fort Lauderdale, FL (US)

( * ) Notice: Subject to any disclaimer, the term of this patent is extended or adjusted under 35 U.S.C. 154(b) by 197 days.

(21) Appl. No.: 17/880,354

(22) Filed: Aug. 3, 2022

(65) Prior Publication Data

US 2023/0040377 A1     Feb. 9, 2023

Related U.S. Application Data

(60) Provisional application No. 63/228,838, filed on Aug. 3, 2021.

(51) Int. Cl.
| | |
|---|---|
| *H04L 9/40* | (2022.01) |
| *H04L 9/00* | (2022.01) |
| *H04L 9/32* | (2006.01) |
| *H04L 41/00* | (2022.01) |
| *H04L 41/08* | (2022.01) |
| *H04L 41/40* | (2022.01) |
| *H04L 67/00* | (2022.01) |

(52) U.S. Cl.
CPC .............. *H04L 9/50* (2022.05); *H04L 9/3263* (2013.01); *H04L 41/08* (2013.01); *H04L 41/20* (2013.01); *H04L 41/40* (2022.05); *H04L 67/34* (2013.01)

(58) Field of Classification Search
CPC ......... H04L 9/50; H04L 41/40; H04L 9/3263; H04L 41/08; H04L 41/20; H04L 67/34
See application file for complete search history.

(56) References Cited

U.S. PATENT DOCUMENTS

| | | | |
|---|---|---|---|
| 10,382,208 B2* | 8/2019 | Shields | H04L 63/0435 |
| 2016/0373474 A1* | 12/2016 | Sood | G06F 21/53 |
| 2018/0241669 A1* | 8/2018 | Muscariello | H04L 63/0807 |
| 2019/0349426 A1* | 11/2019 | Smith | H04L 61/3025 |
| 2023/0421389 A1* | 12/2023 | Hillier | H04L 9/3263 |

* cited by examiner

*Primary Examiner* — Joseph L Greene
(74) *Attorney, Agent, or Firm* — The Concept Law Group, PA; Scott D. Smiley; Scott M. Garrett

(57) ABSTRACT

An autonomous distributed wise area network (AD-WAN) includes several nodes, where each node connects a local area network to an open wide area network, and provides tunnels over the open wide area network to other nodes in the AD-WAN so that computing resources behind each node can communicate as if they were located on a common intranet. Each node has a blockchain wallet and receives updates to a private permissioned blockchain ledger for that AD-WAN. The updates are provided by a control node. Set up, and subsequent change to the AD-WAN are commenced via a customer portal which provides order information to the control node, where the control node processes the order information and generates a blockchain update that informs the affected nodes in the AD-WAN as to what changes are to be made. As a result, the blockchain provides both control plane and order management operation of the AD-WAN.

2 Claims, 11 Drawing Sheets

METHOD FOR ZERO TOUCH PROVISIONING OF AN OPERATIONAL NODE FOR A VIRTUALIZED NETWORK

CROSS REFERENCE

This application claims the benefit of U.S. provisional application No. 63/228,838, filed Aug. 3, 2021, the entirety of which is hereby incorporated by reference.

FIELD OF THE INVENTION

The present invention relates generally to software defined networking, and, more particularly, relates to autonomously created and controlled secure networks that are virtualized over open networks, wherein both control plane and network order management functions of these virtualized networks are administered via a permissioned blockchain distributed ledger.

BACKGROUND OF THE INVENTION

The Internet is a wide area network built on millions of physical connections using both electric and optical communications. This physical network has allowed the creation of logical and routing networks to be defined over the physical networks. The Open Systems Interconnect (OSI) model defines the physical "layer" as Layer 1, the logical layer or data link layer as Layer 2, and the network layer as Layer 3. Setting up conventional network connections for dedicated and secure communication between entities using current methods can take 1-3 months on average due to a large number of manual processes that need to be performed. For example, if a bank opens a new branch location and needs to connect to the bank's intranet, dedicated circuits would have to be put in place to provide the necessary secure communications between the branch and the rest of the banking network. This lead time is an opportunity cost to businesses when, for example, setting up a ordering system with a new buyer.

In a conventional wide area network, meaning an interconnection of proprietary nodes over an open network (e.g. the Internet), each node in the network had to be manually managed. Thus, to add, delete, or modify a node in the network, each node in the network would require a network engineer to access the node and update the configuration to reflect the desired change. As wide area networks grew, management of those networks required considerable human resources, and the opportunity to inadvertently introduce errors into the configuration increased.

Software defined wide area networking (SD-WAN) improved the management of wide area networks by moving the control plane to a centralized system so that configuration changes would come from a centralized repository and would be implemented identically on each network node. Thus, SD-WAN simplified the deployment of configuration changes and reduced the opportunity for errors. However, SD-WAN does not offer any logic to ensure that the configuration changes being applied will be successful, and as such, any errors in the configuration information would then be propagated to every node in the network, which could result in a network outage, or expose the network to unauthorized third parties.

Therefore, a need exists to overcome the problems with the prior art as discussed above.

SUMMARY OF THE DISCLOSURE

In accordance with some embodiments of the inventive disclosure, there is provided a method of placing an order over an autonomous distributed wide area network which includes accessing, from a remote client device, a customer portal over an open wide area network, wherein the portal is coupled to the autonomous distributed wide area network. The method further includes authenticating an entity using the remote client device at the customer portal, and providing, by the customer portal to the remote client device, an order interface. The method further includes receiving, through the order interface, from the remote client device, order information, and generating an order record at the customer portal in response to receiving the order information. The method further includes writing the order record to a permissioned blockchain distributed ledger, wherein access to the permissioned blockchain distributed ledger is controlled such that a plurality of operational nodes can access the permissioned blockchain distributed ledger, and wherein the order record becomes an immutable entry in the permissioned blockchain distributed ledger. The portal and plurality of operational nodes operate over the wide area network to maintain and access the permissioned blockchain distributed ledger.

In accordance with a further feature, the method further includes, at each of the plurality of operational nodes of the autonomous distributed wide area network, monitoring the permissioned blockchain distributed ledger to identify entries in the permissioned blockchain distributed ledger that correspond to the particular one of the plurality of operational nodes, and when any one of the plurality of operational nodes identifies an entry in the permissioned blockchain distributed ledger for the one of the plurality of operational nodes, the one of the plurality of operational node fetching the order information from the respective entry in the permissioned blockchain distributed ledger and the one of the plurality of operational nodes importing the order information into an intranet of an entity associated with the one of the plurality of operational nodes for fulfillment by the entity.

In accordance with some embodiments of the inventive disclosure, there is provided a method for zero touch provisioning of operational nodes in a virtualized network over an open wide area network that includes configuring a computing device with a provisioning seed software program, thereby providing an unprovisioned operational node, wherein the provisioning seed software allows the operational node to contact a control node of the virtualized network over the open wide area network. The method further includes providing the unprovisioned operational node to an entity, and connecting the unprovisioned operation node to the open wide area network at the entity. Responsive to connecting the unprovisioned operational node, the unprovisioned operational node contacts the control node over the open wide area network agnostic of the virtualized network and authenticating the unprovisioned operational node. Responsive to successfully authenticating the unprovisioned operational node, the control node provides a software package to the unprovisioned operational node. Responsive to receiving the software package, the unprovisioned operational node installs the software package and instantiates a provisioned software build at the unprovisioned operational node thereby transforming the unprovisioned operational node to a provisioned operational node. The control node whitelists the provisioned operational node in the virtualized network, wherein the provisioned operational node is thereafter capable of accessing a permissioned blockchain associated with the virtualized network.

In accordance with some embodiments of the inventive disclosure, there is provided an autonomous distributed wide area network that includes a plurality of operational nodes, each node being connected to an open wide area network and configured through a control plane which exists on an encrypted private, permissioned blockchain over the open wide area network and to jointly maintain a distributed ledger in a blockchain that records transactions serviced by entities associated with the operational node. The network further includes at least one control node configured to control access to the network via whitelisting, and which provides initial provisioning of each of the operational nodes.

In accordance with some embodiments of the inventive disclosure, there is provided a proprietary order management system which collects all the necessary information using a wizard from the customers dashboard to provision, modify or decommission services across any nodes they specify that are in scope for that specific order. Orders can connect to themselves at different physical locations or to 3rd parties that are also on our network. If they connect to a 3rd party, then the 3rd party will be required to approve said order. The order is then formatted in a manner that nodes will be able to process/execute. The orders are encrypted and posted to the blockchain *only* by authorized control nodes. Once the transaction is on the blockchain, it is *immutable* and transmitted to all nodes on our network. All nodes receive all order but only nodes in scope execute the orders. It is important to state that only control nodes have write access to the blockchain. Operational nodes only have read access to the blockchain.

Although the invention is illustrated and described herein and in the Appendix as embodied in an Autonomous Distributed Wide Area Network, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claim as well as claims in a non-provisional application based on this application and the Appendix. It is to be understood that the disclosed embodiments are merely exemplary of the invention, which can be embodied in various forms. Therefore, specific structural and functional details disclosed in this provisional application are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

It is to be understood that the terminology used herein is for the purpose of describing particular embodiments only and is not intended to be limiting. For example terms like "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

Any description of the embodiments of the present invention in this provisional application or the non-provisional application, if used, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, logically connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library, modules, and/or other sequence of instructions designed for execution on a computer system. Those skilled in the art can understand the specific meanings of the above-mentioned terms in the embodiments of the present invention according to the specific circumstances. A "node" refers to a computing device including a processor, memory, and peripheral components including networking interfaces, and which is operated by specially designed software to carry out particular computing functionality as will be described. Likewise, a "customer portal" is a computing device including at least one processor, memory, and associated peripheral components such as a database or databases for maintaining records. The customer portal includes a web server functionality to present a web-accessible interface to customers, and provide information to customers and receive information from customers.

BRIEF DESCRIPTION OF THE DRAWINGS

The accompanying figures of the Appendix serve to further illustrate various embodiments and explain various principles and advantages all in accordance with the present invention. In the Appendix.

DETAILED DESCRIPTION OF THE DRAWINGS AND EMBODIMENTS

It is to be understood that the disclosed embodiments are merely exemplary of the invention, which can be embodied in various forms. In general, the invention utilizes an open wide area network over which it defines a proprietary and encrypted network of nodes which facilitates ordering through a portal that is accessible outside the defined network via the open WAN.

The present disclosure shows workflow diagrams of order management and zero touch provisioning, including how a node in a given AD-WAN gets built, including the hardware provisioning, control node operation, and customer web portal operation in the network. In the hardware portion the node equipment is provided by a network authority with software that allows the node to connect to the network authority to be verified, and then, if successfully verified, it is permitted to download the software and data needed to operate on the network, and the network authority whitelists the new node. Any node that is not whitelisted in advance is denied access to the network. The workflow can be used entirely for one organization and it can be used to link the organization to third parties.

The present disclosure further shows a progression illustrating the inventive technology stack, including a general overview, and the zero touch provisioning operation as well as the Layer 3 operation. In the Layer 3 operation the basics of Internet interconnectivity are shown, where various intranets are connected over the Internet via WAN gateways. A node will be in each customer location. A blockchain control plane is established among the nodes, including the control nodes, along with a Layer 2 or Layer 3 tunneling protocol, such as, for example, a virtual extensible local area network (VXLAN), depending on the customer requirements. Finally, and Layer 3 routing is established over the tunneling protocol for secure ordering and network operation.

A software defined ordering network is disclosed in which orders placed over the network are added to a distributed ledger blockchain that is verified by nodes of the network to authenticate and capture the order in an immutable state once authenticated. Each node is initially built by a qualified technician before being installed, and upon being initialized the node will contact the control node(s), authenticate itself, and upon successful authentication, commence downloading build files needed to build the node into an operating node. Once the node is built it becomes part of the network and has a copy of the distributed ledger. Any orders for the business entity are identified on the blockchain, and processed. Other entities can place orders in the network through the portal site, which receives order information and generates a new order record that is introduced into the network and authenticated to be added to the blockchain network.

Figure 1:
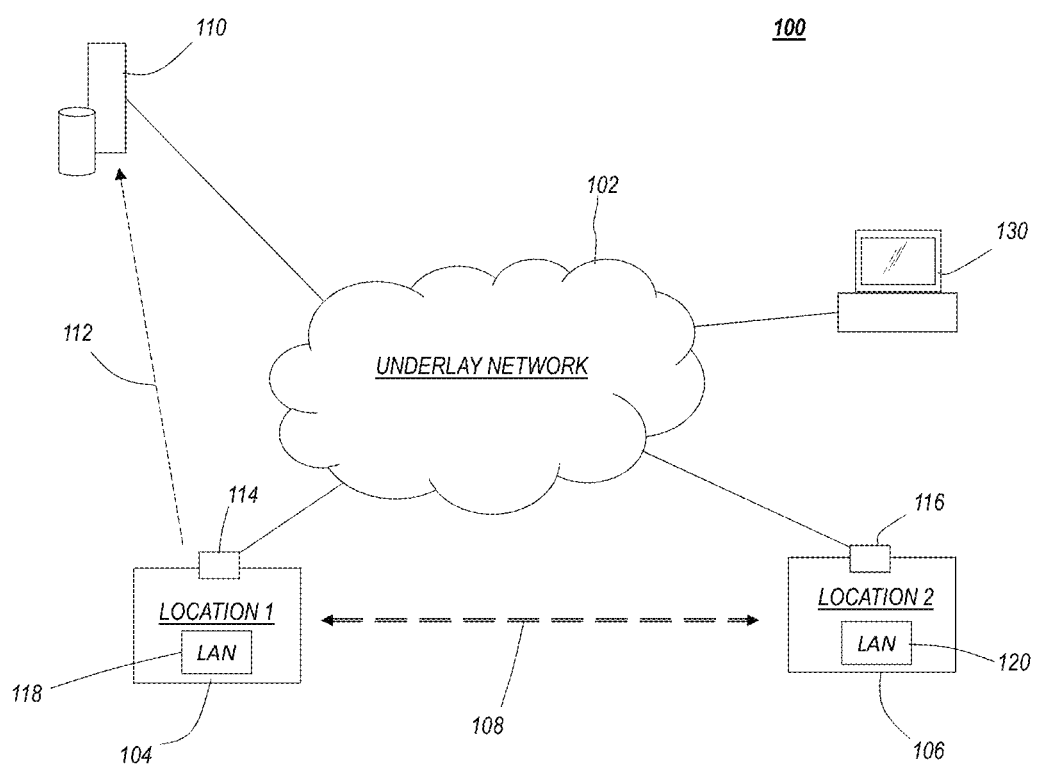
FIG. 1 shows a network diagram of an autonomous distributed wide area network (AD-WAN) in a set up phase, in accordance with some embodiments.

FIG. 1 shows a network diagram of an autonomous distributed wide area network (AD-WAN) 100 in a set up phase, in accordance with some embodiments. The AD-WAN securely links two remotely located premises 104 and 106 over the underlay network 102 using tunneling. The term "underlay network" will be understood to mean an open wide area network, such as multi-protocol label switching (MPLS) networks, the Internet, or dedicated circuits. Each location has its own local area network (LAN) or networks 118, 120, respectively. Client devices are connected to the LANs 118, 120, and to the underlay network via a gateway 114, 116. The gateway 114, 116 can include a firewall, intrusion prevention system and/or access control lists (ACL) to block undesired communications. The two premises 104, 106 are operated by the same entity, and that entity would like to connect the two locations such that they are effectively on a common intranet, as indicated by arrow 108. However, rather than having a dedicated physical circuit established between the two sites, a link using an AD-WAN is to be used instead. An AD-WAN can be secure, so that even though the data is moved across the underlay network, and therefore "in the open," those who might intercept the information will be unable to read it. Further, the AD-WAN must be easily expanded, reduced, and modified. In order to get the AD-WAN link set up, the entity operating premises 104, 106 must contact the customer portal 110 and transmit a request 112 for service. For example, a remote client device 130 can be used to browse to a uniform resource locator (URL) or website address that routes browsing requests to the customer portal. In response to the browsing request, the customer portal 110 serves web pages including interface elements to the browser of the remote client device 130. The customer portal 110 provides a proprietary order management system, including a website that is served over the underlay network that allows customers to establish, modify, and remove services. The remote client device 130 can be located on one of the LANs 118, 120, or it can be independent of those networks.

To establish service, each of the two premises 104, 106 must deploy a node that is provisioned to provide the AD-WAN operation. A node is hardware computing platform specifically designed to support and facilitate AD-WAN operation, and includes, among other components, a processor, memory (both volatile and non-volatile), networking interfaces (e.g. Ethernet, optical, WiFi connections). The node will have an underlay network protocol (IP) address that is recognized by underlay network routers, and will also have an assigned wallet address for receiving blockchain distributed ledger updates. In order to set up the desired AD-WAN, a combination of the methods of FIGS. 2, 3, and/or 4 must be followed. As a result of completing those methods, the customer (e.g. the entity operating premises 104, 106) will receive a hardware package for each location 104, 106. The hardware package will be a node that is pre-configured to self-configure upon being properly connected at the respective location 104, 106 and then turned on. Thereafter each of the nodes will set up a virtual extensible network link between them, and the communication will be by an encrypted tunnel. Ledger updates on the permissioned private blockchain will be used to change operating parameters, add new nodes to the AD-WAN, and remove nodes from the AD-WAN. Thus, both the control plane and order management, referring to ordering changes in AD-WAN service, are performed via the private permissioned blockchain.

According to the inventive embodiments, control of the AD-WAN is generally automated. That is, a control system operates is put in place that allows entities to set up, modify, and take down nodes for their own secure software defined networks operating over the underlay network. Tunneling is used to connect defined operational nodes. Orders, referring to changes made by an entity to their particular defined WAN (e.g. adding a new node, removing a node, modifying a node) are made through the customer portal 110, which then determines the configuration changes needed for other nodes in the given customer's AD-WAN, and publishes these changes on a private permissioned blockchain ledger that is distributed to all of the node. Those nodes affected by the changes then implement the indicated configuration changes. Thus, manual configuration is not required, and changes can be promulgated very quickly, and securely, and error free, resulting in increased efficiency. Further, because of the inventive pre-configuration of hardware, new nodes can be installed easily and quickly, in a "plug and play" type of operation that doesn't require a local technician to provision the node.

Figure 2:
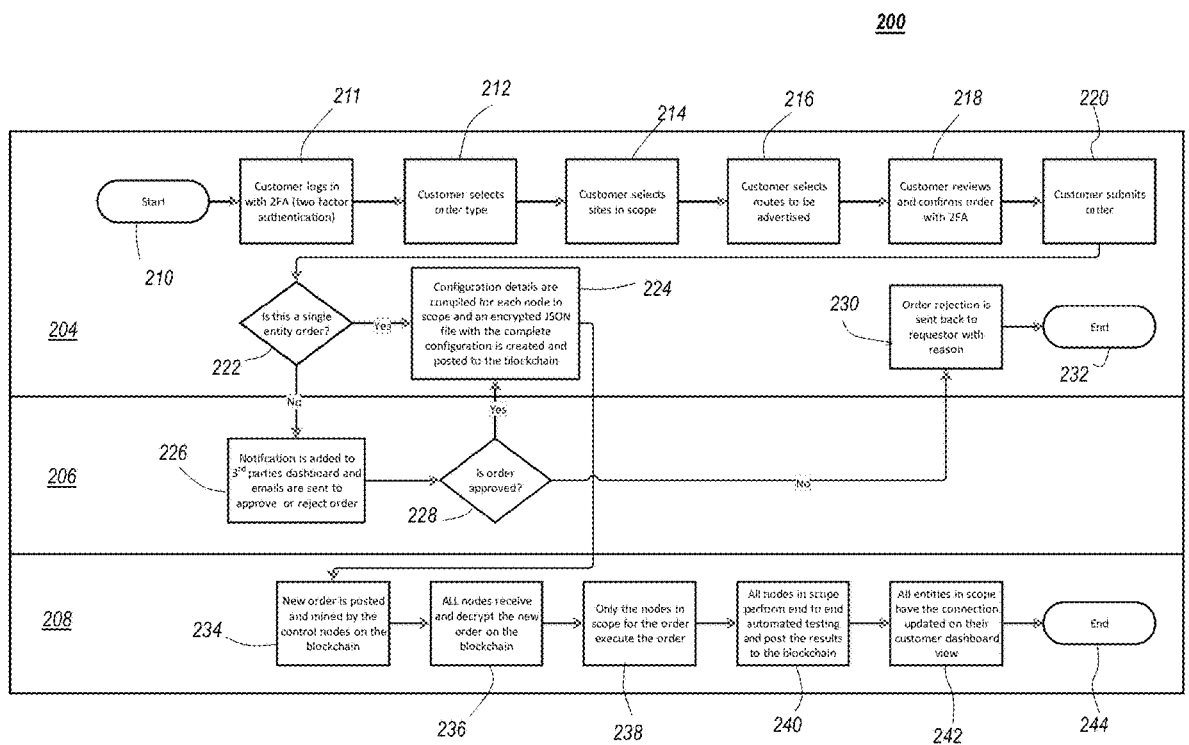
FIG. 2 shows a flow chart diagram of a method for entering an order at a web server of an AD-WAN service provider webserver, in accordance with some embodiments.

FIG. 2 shows a flow chart diagram of a method 200 for entering an order at a web server (e.g. 110) of an AD-WAN service provider webserver, in accordance with some embodiments. The method 200 is broken into three levels, which are a central portal level 204, a third party level 206, and a blockchain level 208. At the start 210 the customer has performed their due diligence and determined the IP address for, or at each location 104, 106, among other networking information. Subsequently, the customer logs into an account using two factor authentication at the customer portal (110). Upon logging in the customer will be presented with an interface that allows the customer to select an option to set up a new node. Thus, in process 212 the customer selects an order type, and selects a new order. The customer can also select an option to have a node removed, and an option to modify a node operation. In step 214 the web server presents the customer with an option to select the nodes operated by the customer that will be affected. For example, if the customer is adding a node, then the customer will indicate the network information for the new node. Further, any existing nodes that are to connect with the new node can be identified. If the customer is removing a node, then that existing node is identified, and likewise for a node that is to be modified (e.g. add or reduce bandwidth). In step 216 the routes that are to be advertised are indicated by the customer. This refers to the routes to use among existing nodes in the customers AD-WAN, which indicates how data is routed among the nodes. In step 218 the customer is presented with an order summary and can be asked to confirmed with two factor authentication again. Once the customer approves the order, then in step 220 the order is submitted at the website. This means the computing equipment at, or associated with the customer portal transmits the order information to a control node (e.g. 126 in FIG. 5), which then generates a configuration file in accordance with the order. In step 222 the method 200 determines if the order is s single party order or whether a third party is involved. If a third party is involved, then in step 226 the third party is notified, assuming the third party is also a user of the system and has an account. Email can be sent to the appropriate personnel of the third party, for example. Then in step 228 the system determines whether the third party has approved the order. If not, then the method 200 proceeds to step 230 where the order is rejected, and the process ends 232. Alternatively, in either case at decision 222 if the order is approved, then in step 224 configuration details are compiled for each node in scope of the order and an encrypted JSON (JavaScript Object Notation) file is created with the complete configuration for each node, and this is posted by the control node (e.g. 126 in FIG. 5) to the private permissioned blockchain. The configuration information indicates the IP addresses of other nodes in the customer's AD-WAN, as well as routing information among those nodes through encrypted tunnels between nodes that allows connection between nodes, as desired by the customer.

Once the JSON file published to the private permissioned blockchain, the control node(s) in step 234 verify it, and in step 236 all nodes receive the blockchain update. All nodes will then check the blockchain update in step 238 to determine if the update pertains to them. Those nodes in scope for the order (the ones affected) then process the information and update their configuration to reflect the order. The configuration is initially loaded as a temporary configuration so that in step 240 the nodes can then perform testing, which involves sending test packets to various other nodes over the AD-WAN. Test results can optionally be published on the blockchain, although in some embodiments only the control node can write to the blockchain. Node can also forward test results to the control nodes for publication on the blockchain, as well updating the customer's AD-WAN dashboard the gets presented to them by the website (e.g. customer portal 110). And then the method is completed 244.

Figure 3:
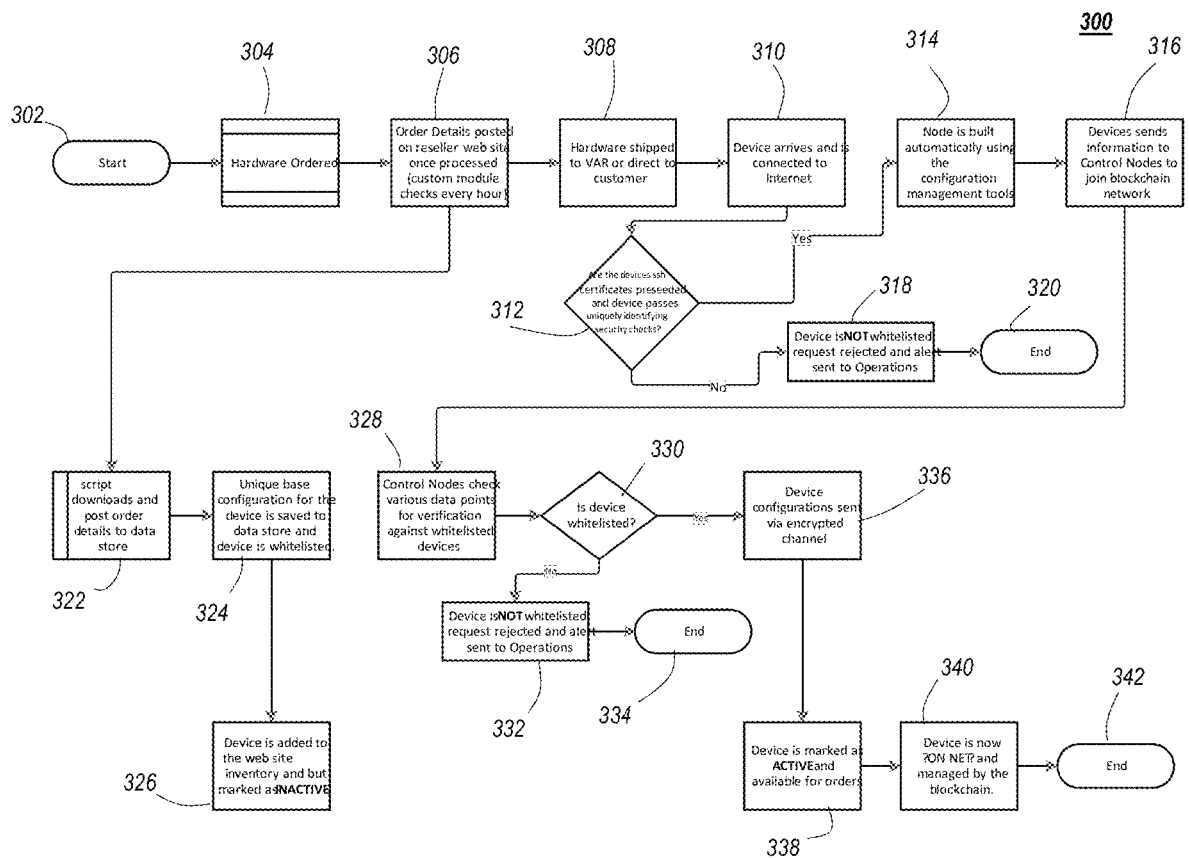
FIG. 3 shows a flow chart diagram of a method for automatic provisioning of hardware node to act as a node in a customer's AD-WAN, in accordance with some embodiments.

FIG. 3 shows a flow chart diagram of a method 300 for automatic provisioning ("zero touch provisioning") of hardware node to act as a node in a customer's AD-WAN, in accordance with some embodiments. The method 300 allows a customer to order the hardware required to operate a new node for their AD-WAN. The node will be automatically provisioned with the network information of the other nodes in the customer's network, or at least the ones that it will connect with. As a result, the hardware will arrive at the customer's premises, and the customer only needs to make the physical connection between the underlay network at the premises and node hardware, and then turn it on. The node hardware will automatically configure itself and be able to connect to the LAN at premises and provide secure AD-WAN operation between the premises and other premises at which the customer has nodes operating.

At the start 302 the customer logs into their account at the website provided by the web server (e.g. 110). In the appropriate menu interface, the customer can then order the hardware in step 304. The customer will indicate the location, IP address, and LAN configuration details. Then a parallel process occurs with a one path going to step 322 and another going to step 308. In step 322 the appropriate configuration details are compiled, including hardware details such that the media access controller addresses of the node device. This information is put into a script, and in step 324 a base configuration is generated and stored, and the hardware device can then be whitelisted as an authorized device, and given the status of INACTIVE in step 326. Returning to step 308, the hardware for the node is shipped to the customer or an entity associated with the customer. In step 310 the device arrives at the premises and is connected to the underlay network. In step 312 the device or devices are tested to determine if they have the correct SSH certificates and if other unique identifying information (e.g. MAC addresses) can be verified. This test is performed by the device connecting to the control node over the underlay network and responding to queries from the control node. If the device does not pass the ID test in step 312, then the device is de-listed and is not allowed to join any network in step 318 and the method ends 320. If the device does pass the ID test in step 312, then in step 314 the node configuration is built using a configuration management tool at the control node. In step 316 the node device sends information to the control node so that a wallet address of the node can be added to the blockchain ledger distribution, enduring the node will receive blockchain updates. In steps 328, 330 the control node then verifies the information against that associated with the whitelisted device. If the device sending the request for access to the blockchain is not whitelisted, then the request is rejected 332 and the method ends 334. If the device is found to be whitelisted, then in step 336 the control node transmits the device configuration over an encrypted channel to the device. Upon receiving the configuration information, the device sets up its own configuration and is then able to operate on the customer's AD-WAN. At the same time, in step 338, the control node marks the device as active and available for connection to the AD-WAN. In step 340 the device is then connected and receiving blockchain updates and is managed by updates to the blockchain. With nothing else remaining the method ends 342. At this point, the method of FIG. 2 can be used to add connectivity to the newly installed node.

Figure 4:
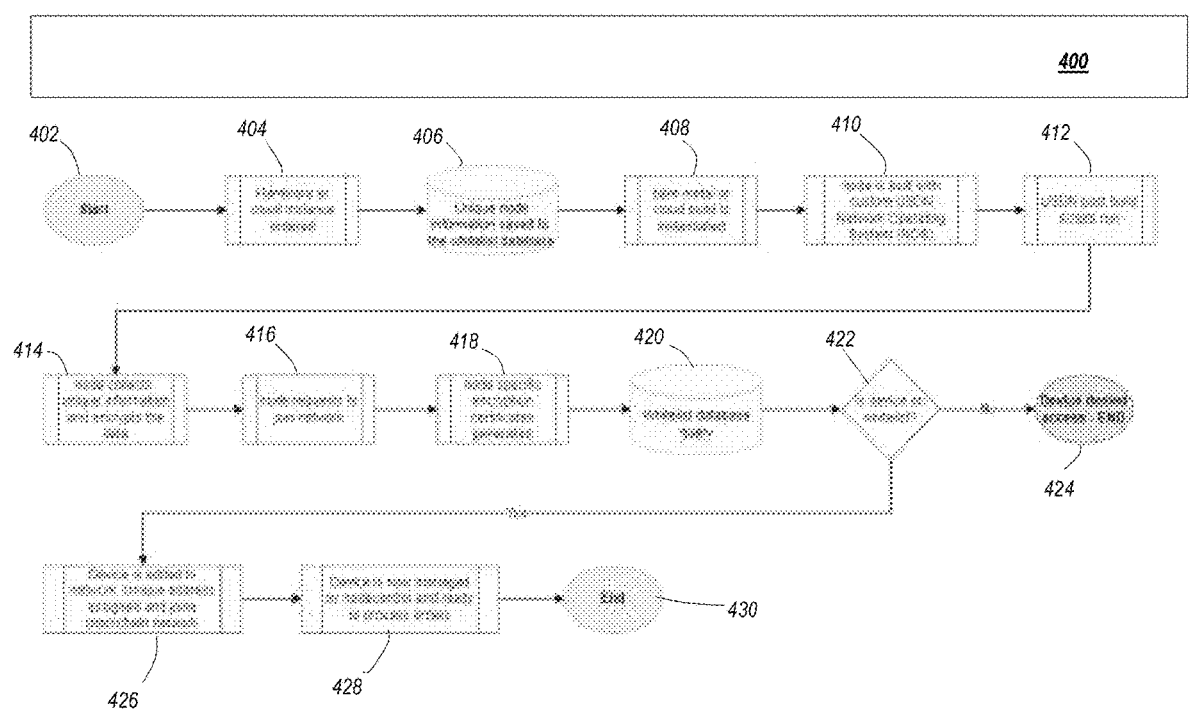
FIG. 4 shows a flow chart diagram of simplified method referred to as zero touch provisioning, for setting up a hardware node to operate on a customer's AD-WAN, in accordance with some embodiments.

FIG. 4 shows a flow chart diagram of simplified method 400 referred to as zero touch provisioning, for setting up a hardware node to operate on a customer's AD-WAN, in accordance with some embodiments. At the start 402, and customer initiates the process to procure a new node, and in step 404 the hardware device or cloud resources are ordered. The order includes certain customer information and information needed to initialize the node. In step 406 the unique node information is saved to the whitelisted database, which is a database of whitelisted nodes. In step 408 the hardware ("bare metal") or the cloud resource is instantiated, meaning it is connected to the underlay network. If the node is implemented by a hardware device, the device must be shipped to the customer's premises. In step 410 the node software is built using a custom and proprietary node network operating system. Once the node software is built, then in step 412 post-build scripts are run and in step 414 the node collects information generated by running the scripts. The scripts generate or incorporate a unique hostname and a fully qualified domain name. Further, the script verifies the interfaces to be used by the node and marks the interface as being active. The scripts ensure that the correct version of software and their dependencies are installed, and that certain CRON jobs are scheduled (e.g. commands to be executed in the future). The information collected by the node can include the hostname, the fully qualified domain name, the manufacture of the node hardware, the mode of the node hardware, the firmware version installed in the node, a serial number, the processor type, the number of cores used by the processor, the total random access memory (RANI) in the node, and, for each network interface, the name, IP address, gateway, and MAC addresses. This information is then encrypted and sent to the control node in a request to join the network in step 416. This can include confirming that the node has a valid hostname and fully qualified domain name using scripted self-checks, and the node submitting its unique information in an encrypted manner to be processed against the whitelist. In step 418 the control node generates specific encryption certificates for the node. In step 420 the whitelist database is queried to ensure the node is whitelisted; if not then the method ends 424. If the information gathered in step 416 match a whitelist entry, then the Client ID and Site ID to which the node belongs are known and verified. The node can then begin sending telemetry data that is used to populate customer dashboards by the web server (e.g. 110). The date collected can include CPU utilization down to the cores, memory utilization, disk space used/available, bandwidth utilization by distinct interface, and network underlay/overlay performance and utilization. Then in step 426 the node is added to the network, meaning its unique address is assigned and it is joined to the blockchain network. Once the node is joined to the blockchain network it is entirely managed via the blockchain. Configuration changes will be published to the blockchain and those that apply to the specific node will be implemented by the node; those that do not apply to the node will be ignored by the node in step 428. Once so set up, the method ends 430.

Figure 5:
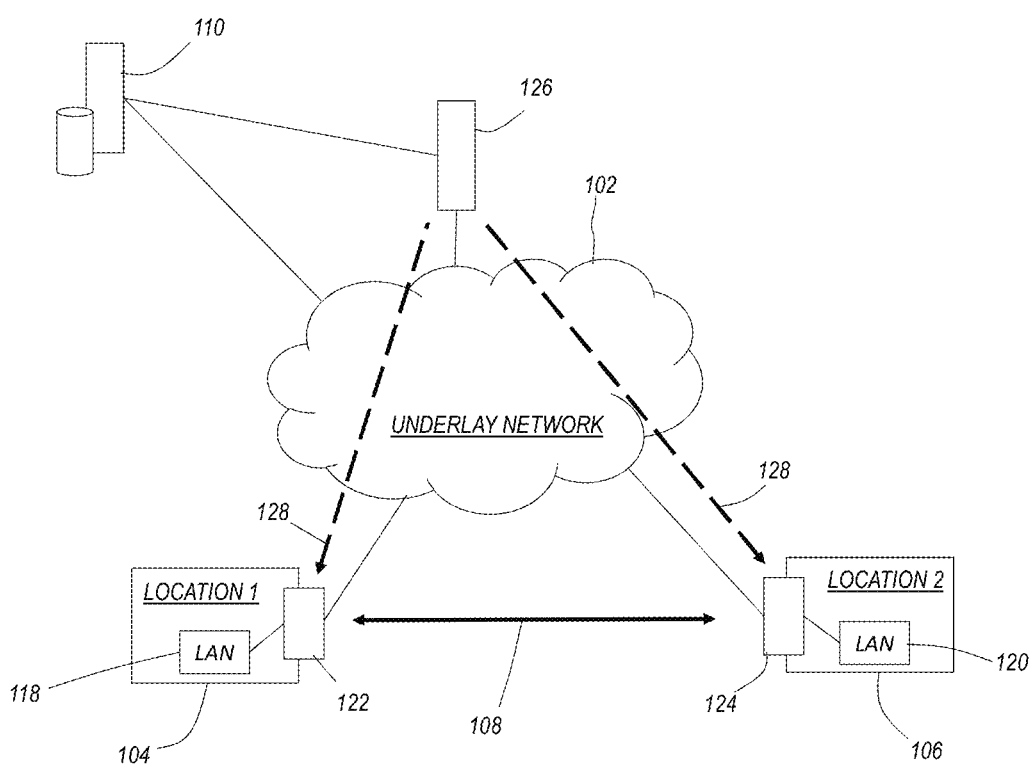
FIG. 5 shows a modified network after an AD-WAN has been set up which links to remote locations, in accordance with some embodiments.

FIG. 5 shows a modified network after an AD-WAN has been set up which links to remote locations, in accordance with some embodiments. The network here is based on the network of FIG. 1, and assumes process such as those of FIGS. 2-4 have been undertake to set up AD-WAN nodes at each of the premises 104, 106. Specifically, node device 122, 124 have been set up using the automated provisioning described in FIGS. 3-4, and a network connection 108 has been set up through an order process indicated in FIG. 2. The node devices 122, 124 can be referred to as "operational nodes," or simply "nodes." The connection 108 is an encrypted tunnel carried over the underlay network that allows computing devices connected to the respective LANs 118, 120 to communicate as if they were on the same intranet. Each node device 122, 124 receives blockchain updates 128 from the control node 126. Any changes being made to either node 122, 124 will be indicated in the blockchain, and upon identifying the blockchain update for that node 122, 124, the node 122, 124 will then change its configuration according to the order. As a result, the nodes 122, 124 are both set up and managed automatically, with management occurring via the blockchain acting as the control plane. The blockchain updates are provided to the control node 126 by the customer portal 110, which receives order information from the customer portal 110 and then publishes the information on the blockchain.

Figure 6:
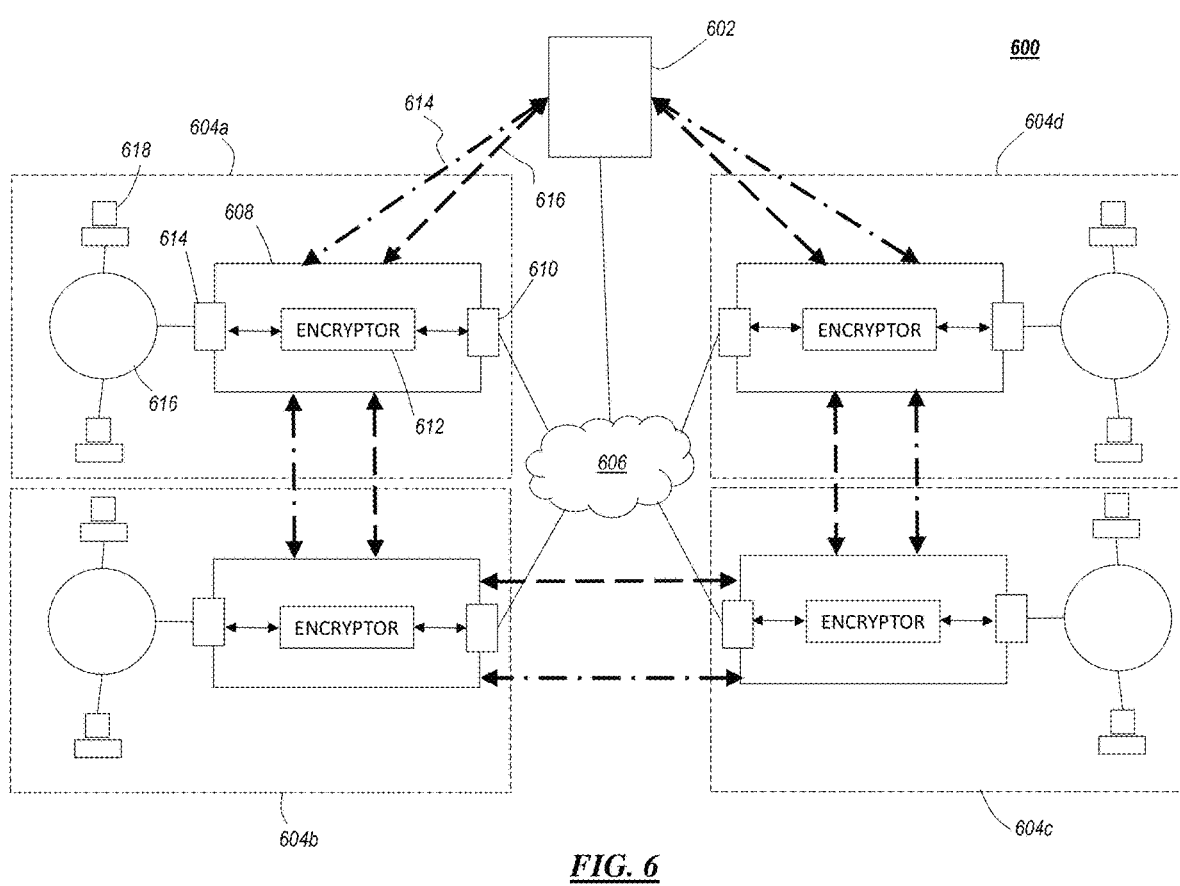
FIG. 6 shows a network diagram of an automated and automatically provisioned AD-WAN, in accordance with some embodiments.

FIG. 6 shows a network diagram of an automated and automatically provisioned AD-WAN 600, in accordance with some embodiments. The AD-WAN 600 is substantially similar to that of FIG. 5, but shows more detail. The AD-WAN 600 is spread across multiple premises 604a-604d. These premised 604a-604d can be located next to each other, as in adjacent buildings, or they can be spread out across the country. The premises each belong to a common enterprise or organization, and need to communicate as if on a common intranet. Each premise 604a-604d includes a node 608 that is connected to the underlay network 606 using a wide area network interface 610, and communicates with other nodes in the AD-WAN using encrypted tunneling. As a result, the premises 604a-604d are connected by a tunneling protocol. Each node 608 will have its own virtual network interface (VNI). Encryption and decryption operations are carried out in the node by an encryptor 612, which operates in both directions, and is further connected to the LAN interface 614, such as a router that provides a local network 616 to which local client devices 618 and other resources are connected (e.g. databases, servers, and other proprietary enterprise resources). The tunneling between nodes is represented by the heavy dashed lines 616, while the blockchain information is represented by the dash-dot lines 614. The control node 602 periodically publishes updates to the blockchain, which are provided to each node 608. Each node 608 then examines the updates to determine if the updates pertain to them. The node identifier will be indicated in the blockchain update, for example. If the customer operating the AD-WAN wants to make a change, such as adding a new node, removing a node, or changing the operation of a node (e.g. adding an additional tunnel). Any orders/changes are promulgated over the blockchain and all affected nodes will receive the information and automatically change their configuration accordingly.

Figure 7:
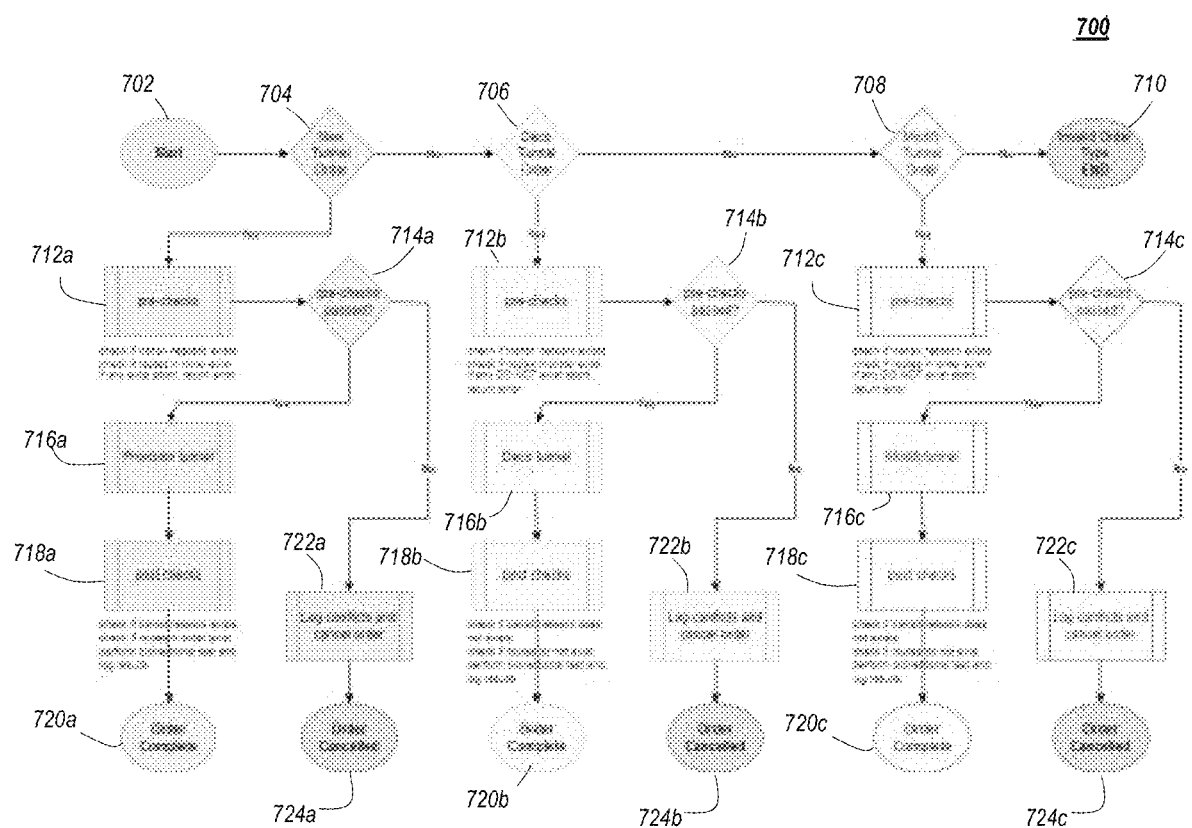
FIG. 7 shows a flow chart diagram of a method for order processing by a customer to add a connection, remove a connection, or modify a connection in the customer's AD-WAN, in accordance with some embodiments.

FIG. 7 shows a flow chart diagram of a method 700 for order processing by a customer to add a connection, remove a connection, or modify a connection in the customer's AD-WAN, in accordance with some embodiments. It is assumed that the required nodes are in place and operational. Each of the orders follow similar processing path and can be described together. The method 700 starts by the customer logging onto their account with the system customer portal (e.g. 110), and completing the required two factor authentication. There are three types of orders the customer can request; add a new tunnel 704, decommission and existing tunnel 706, or modify an existing tunnel 708, otherwise the method ends 710. The orders are entered into the web server in the customer's account via an appropriate interface, and verified as being possible. The order is then provided to the control node which then publishes the order to the blockchain, where it is then detected by the affected nodes. The blockchain being permissioned, the nodes will only see order information pertaining to them. At each of the affected nodes, for each order a series pre-checks are completed in steps 712a-712c. The pre-checks determine if the resources needed to complete the order are available and ensure the order is not redundant of another order. In steps 714a-714c the result of the pre-checks are examined to determine if they meet the necessary requirements. If not, then the conflicts or errors are logged in steps 722a-722c and the method ends with the order cancelled 724a-724c. If the pre-checks are passed then in steps 716a-716c either a new tunnel is provisioned (716a), a tunnel is decommissioned (716b), or a tunnel is modified (716c). After operation of 716a-716c is completed, post checks are run to verify the operational change was successfully complete in steps 718a-718c. If the post checks are passed then the order is complete 720a-720c.

Figure 8:
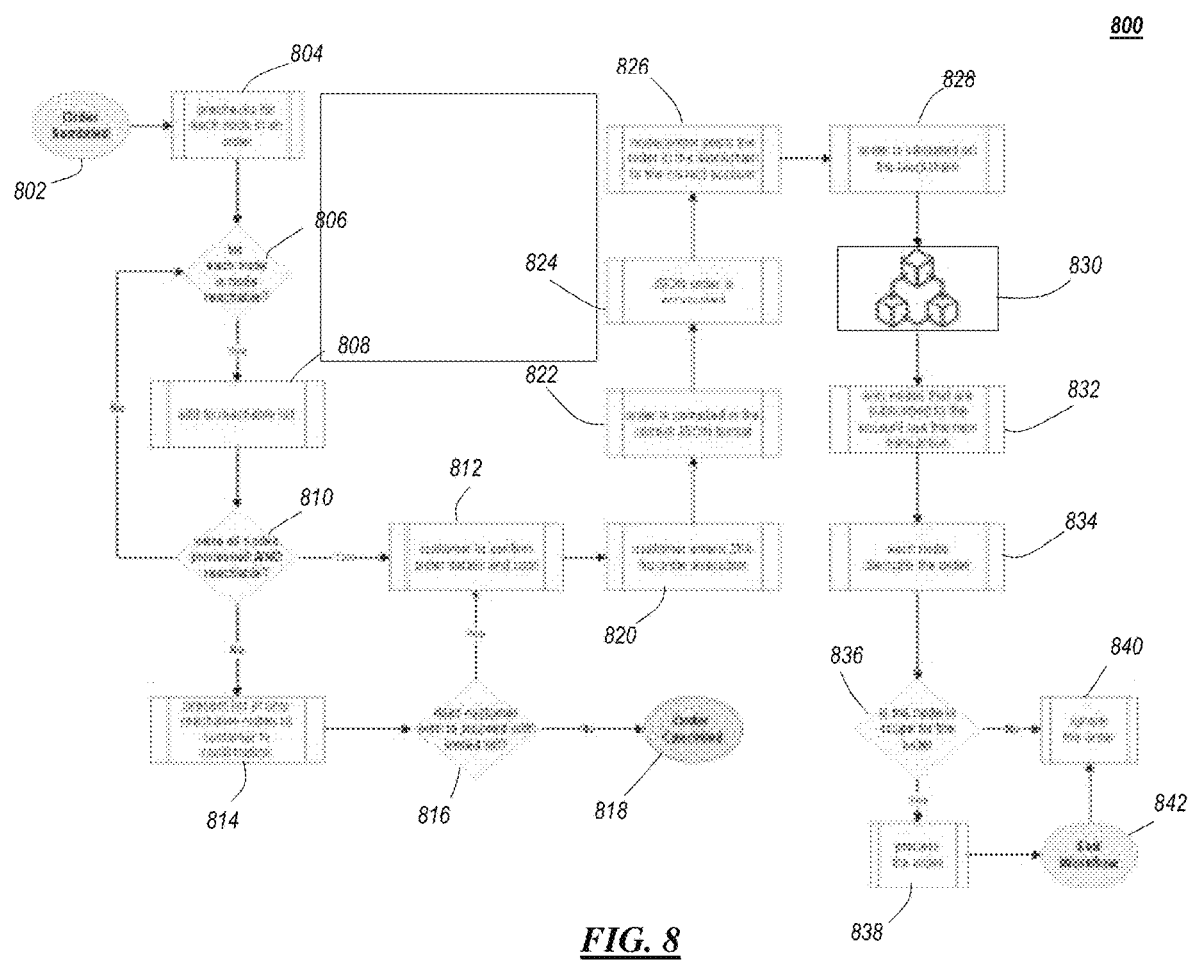
FIG. 8 shows a flow chart diagram of a method for processing an order and promulgating the order to the permissioned blockchain distributed ledger, in accordance with some embodiments.

FIG. 8 shows a flow chart diagram of a method 800 for processing an order and promulgating the order to the permissioned blockchain distributed ledger, in accordance with some embodiments. The method 800 repeats some of the information provided in regard to FIG. 2, and provides further detail as well, and further detail related to method 700 of FIG. 7. In step 802 a customer submits an order. The order applies to one or more existing and provisioned nodes, and generally relates to the tunneling performed by the node with other nodes. In response to the order being submitted, in step 804 pre-checks are completed for each node in the order. In step 806 the control node determines whether each node is reachable. In step 808 any node not on the reachable list that is found to be reachable is added to the reachable list. Step 810 iterates steps 806, 808 for each node and determines if all of the nodes are reachable. If not all of the nodes were reachable, then in step 814 a list of nodes and the status is presented to the customer. The customer can then decide whether to proceed with the order in step 816. If not, then the method ends and the order is cancelled in step 818. If in step 810 all of the nodes are found to be reachable, or if in step 816 the customer wishes to proceed even though one or more of the nodes are not reachable, then in step 812 the customer is asked to conform order details and the cost of making the change. To confirm the order, in step 820 the customer enters there two factor authentication again. The web server then compiles the order in a JSON format in step 822, and encrypts it in step 824. The control node then posts the order to the blockchain and indicates the appropriate customer information in the blockchain to permission the order information in step 826. In step 828 the order information is validated on the blockchain by the next node, and in step 830 the order information is then promulgated to all nodes on the blockchain. Nodes validate blocks in a round robin fashion, in some embodiments, in this trusted permission blockchain. This includes nodes not affected by the order, as well as nodes not operated/owned by the customer. In step 832, after updating their local copy of the distributed ledger, each node decrypts the order locally. In step 836 the nodes determine whether they are affected by the order, and in step 840 those nodes not affected (e.g. identified in the order information) ignore the order and discard the information, and mark the blockchain update as having been processed. In step 838, those nodes affected by the order than process the order and change their AD-WAN configuration accordingly. In step 842 the method ends.

Figure 9:
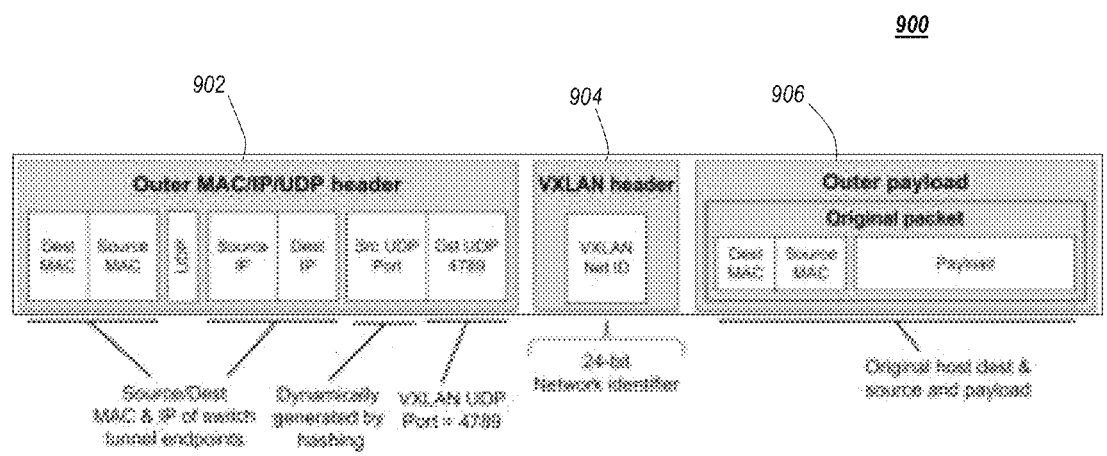
FIG. 9 shows a diagram of a data packet for transmission over a virtual extensible network in an AD-WAN, in accordance with some embodiments.

FIG. 9 shows a diagram of a data packet 900 for transmission over a virtual extensible network in an AD-WAN, in accordance with some embodiments, as an example of one type of a tunneling protocol. The data packet includes an outer MAC/IP/UDP header 902, a VXLAN header 904, and the payload 906. The outer header 902 indicates the destination MAC, source MAC, UDP (user datagram protocol) information, source IP address, destination IP address, the source UDP port and the destination UDP port. The MAC and IP address information in those section relate to the switch tunnel endpoints, meaning the nodes. This information is used by underlay network equipment to route the data packet 900 across the underlay network from node to node of the AD-WAN. The VXLAN header 904 indicates the VXLAN information to identify the data packet as belong to a particular AD-WAN. If the receiving node does not recognize this identifier, the data packet can be discarded. The payload information 906 can be used to identify a particular session to which the data packet 900 belongs, including identifying the sending source MAC and the receiving MAC, and actual data (payload). Those skilled in the art will appreciate that various other packet arrangements can be used in accordance with other tunneling protocols.

Figure 10:
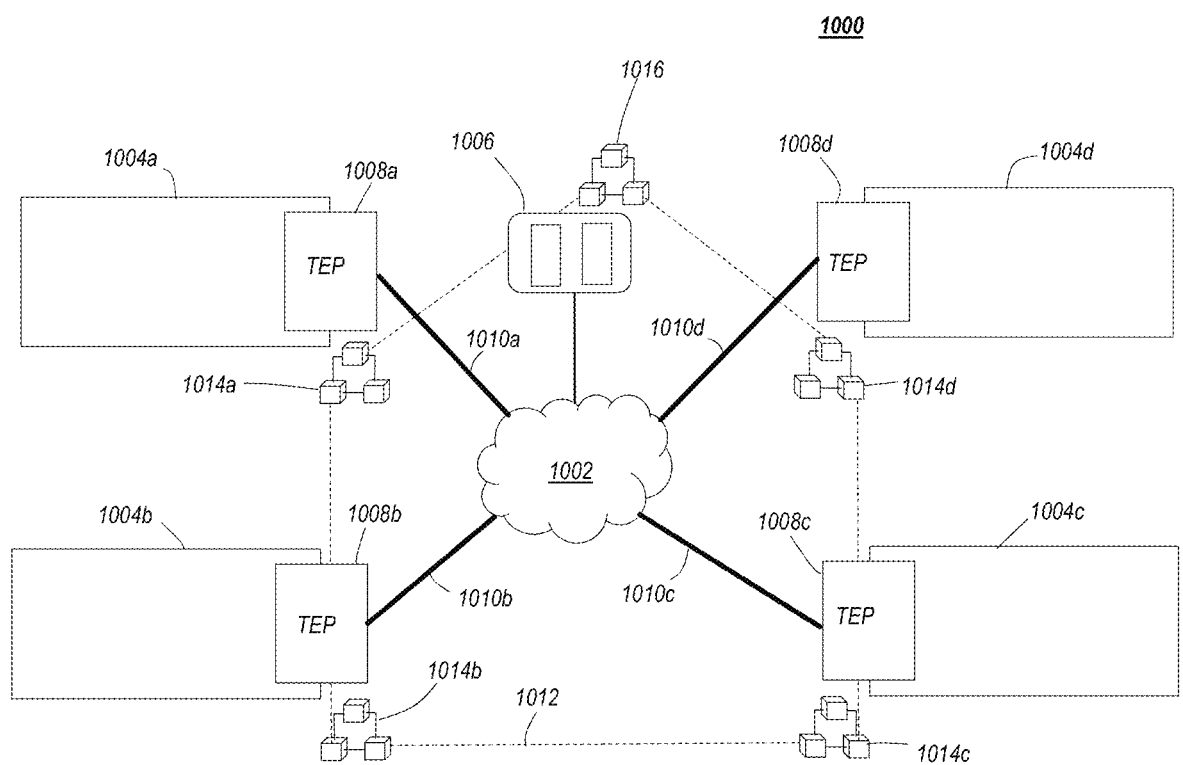
FIG. 10 shows a fully virtualized AD-WAN that joins multiple remotely located facilities, in accordance with some embodiments.

FIG. 10 shows a fully virtualized AD-WAN 1000 that joins multiple remotely located facilities, in accordance with some embodiments. Again, the underlay network 1002 is the bearer network over which the tunneling protocol traffic is carried. Each node 1004a-1004d includes a tunnel endpoint (TEP) 1008a-1008d. The nodes 1004a-1004d can be located in different places, but they each server a local area network and provide intranet type connectivity between nodes for their respective client devices and computing resources connected to the various LANs. The control node 1006 maintains a master copy of the blockchain ledger 1016 and transmits updates to each wallet address 1014a-1014d associated with each node 1004a-1004d on the blockchain network 1012. Each node has at least one tunnel 1010a-1010d provisioned. Each tunnel 1010a-1010d connects to another node. Each node does not need to have a tunnel to each other node as nodes can be used to route data to other nodes. When tunnel 1010a-1010d is to be added, decommissioned, or modified, the control node 1006 will validate the accepted order on the blockchain 1016, and the update will then be promulgated to the other nodes' wallets 1014a-1014d. Each node will decrypt the update to determine whether the update pertains to them or not.

Figure 11:
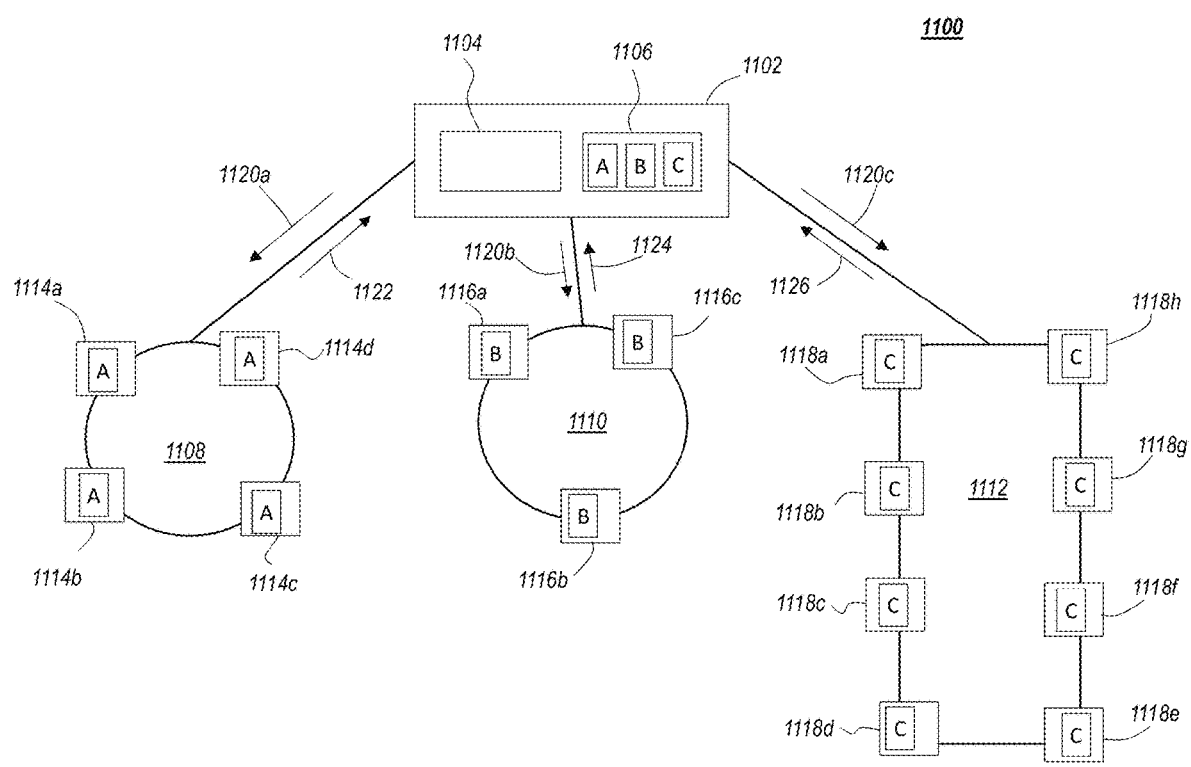
FIG. 11 shows a broader network diagram of a plurality of AD-WANS managed by a control authority entity, in accordance with some embodiments.

FIG. 11 shows a broader network diagram of a plurality of AD-WANS 1100 managed by a authority entity 1102, in accordance with some embodiments. The authority entity includes a customer portal 1104 that allows customers to control their respective AD-WAN networks, and provide metrics and other information to the customer, as well as to allow the customer to place orders for changing their AD-WAN. Further, the authority entity includes a control node 1106. In the present example there are three AD-WANs 1108, 1110, and 1112. There can be more or fewer AD-WANs operated by a control authority 1102. Each of the AD-WANs can be operated by independent and unaffiliated entities. AD-WAN 1108 include nodes 1114a-1114d, while AD-WAN 1110 includes nodes 1116a-1116c, and AD-WAN 1112 includes nodes 1118a-1118h. Each of the nodes is controlled by blockchain updates 1120a-1120c to the respective AD-WAN nodes. Likewise, operational metrics 1122, 1124, 1126, which vary by node, can be reported to the control authority 1102. If, for example, the operator of AD-WAN 1108 wants to set up a tunnel between nodes 1114a and 1114c, the customer enters an order that then gets promulgated to all nodes on the corresponding blockchain 1120a-1120c.

Generally, each AD-WAN 1108, 1110, 1112 has its own blockchain ledger. The control node 1106 controls the blockchain ledger for each AD-WAN. For example, AD-WAN 1108 can use a blockchain ledger "A," AD-WAN 1110 can use blockchain "B", and AD-WAN 1112 can use blockchain "C." In some embodiments different AD-WANs may share a blockchain, but generally each AD-WAN will have its own blockchain. Each node 1114a-1114d, 1116a-1116c, 1118a-1118h will have a copy of the respective blockchain ledger for that AD-WAN and receive updates to that blockchain ledger from the control node 1106. Further, while one control node 1106 is shown in control of several AD-WANs, it will be appreciated that additional control nodes can be used. It is contemplated, for example, that some enterprises may require a dedicated control node for their AD-WAN.

The disclosed embodiments provide a system and method for autonomous distributed wide area networks, including the automated deployment of nodes using the "zero touch" provisioning process, as well as the automated control of deployed nodes, and the automated deployment of orders (changes) to the AD-WAN. The backbone of the system and method is the use of a private permissioned blockchain ledger that provides both the control plane for the AD-WAN, and which handles order management. The use of a blockchain allows instant, verified, immutable configuration changes to be promulgated to each node in the AD-WAN, and the nodes affected by the order can make the necessary changes upon receiving an update to the blockchain. By providing both control plane and order management on the blockchain, changes occur faster and without error over conventional network management approaches.

What is claimed is:

1. A method for zero touch provisioning of operational nodes in a virtualized network of an entity over an open wide area network, comprising:
    configuring a computing device with a provisioning seed software program, thereby providing an unprovisioned operational node, wherein the provisioning seed software program allows the unprovisioned operational node to contact a control node of the virtualized network over the open wide area network;
    providing the unprovisioned operational node to the entity at a premises of the entity;
    connecting the unprovisioned operational node to the open wide area network at the premises of the entity;
    responsive to connecting the unprovisioned operational node, the unprovisioned operational node contacting the control node over the open wide area network agnostic of the virtualized network and authenticating the unprovisioned operational node to the control node;
    responsive to successfully authenticating the unprovisioned operational node to the control node, the control node providing a software package to the unprovisioned operational node;
    responsive to receiving the software package, the unprovisioned operational node installing the software package and instantiating a provisioned software build at the unprovisioned operational node thereby transforming the unprovisioned operational node to a provisioned operational node that is capable of communicating with at least one other operational node of the entity using the virtualized network to simulate an intranet between the provisioned operational node and the at least one other operational node, and wherein only provisioned operational nodes of the entity are able to access the virtualized network of the entity; and
    the control node whitelisting the provisioned operational node in the virtualized network on a permissioned blockchain associated with the virtualized network, wherein the provisioned operational node is thereafter capable of accessing the permissioned blockchain associated with the virtualized network, and wherein the at least one other operation node obtains network information of the provisioned operational node from the permissioned blockchain.

2. The method of claim 1, wherein the provisioning seed software program includes information about the virtualized network of the entity, including an IP address to be used by the provisioned operational node.

\* \* \* \* \*